United States Patent
Akasaka et al.

(10) Patent No.: US 8,107,815 B2
(45) Date of Patent: Jan. 31, 2012

(54) SYSTEM AND METHOD FOR COMMUNICATING WIRELESS DATA UTILIZING A PASSIVE OPTICAL NETWORK

(75) Inventors: Youichi Akasaka, Allen, TX (US); Takao Naito, Plano, TX (US); Satoshi Mizutani, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 12/059,562

(22) Filed: Mar. 31, 2008

(65) Prior Publication Data

US 2009/0245805 A1 Oct. 1, 2009

(51) Int. Cl.
*H04J 14/00* (2006.01)

(52) U.S. Cl. .................. 398/71; 398/70; 398/66

(58) Field of Classification Search .............. 398/71, 398/70, 69, 66, 73, 128, 130, 68; 455/553.1, 455/552.1, 151.2, 39, 500, 507, 66
See application file for complete search history.

(56) References Cited

U.S. PATENT DOCUMENTS

| | | | |
|---|---|---|---|
| 7,565,080 B2 * | 7/2009 | Mickelsson et al. | 398/58 |
| 7,672,591 B2 * | 3/2010 | Soto et al. | 398/72 |
| 2005/0129102 A1 * | 6/2005 | Yagawa et al. | 375/222 |
| 2008/0063397 A1 * | 3/2008 | Hu et al. | 398/43 |

* cited by examiner

*Primary Examiner* — M. R. Sedighian
(74) *Attorney, Agent, or Firm* — Baker Botts L.L.P.

(57) ABSTRACT

In one embodiment, a method for providing wireless communications utilizing a passive optical network (PON) is disclosed. The method includes receiving, at a PON, downstream packets from a base station destined for a mobile station, and transmitting the downstream packets to wireless transceivers associated with PON. The method also includes receiving, at the first wireless transceiver communicatively coupled to a first optical network terminal (ONT), the downstream packets from the first ONT and transmitting a first wireless signal comprising the downstream packets to a first cell. The method also includes receiving, at a second wireless transceiver communicatively coupled to a second ONT, the downstream packets from the second ONT and transmitting a second wireless signal comprising the downstream packets to a second cell.

25 Claims, 4 Drawing Sheets

SYSTEM AND METHOD FOR COMMUNICATING WIRELESS DATA UTILIZING A PASSIVE OPTICAL NETWORK

TECHNICAL FIELD

This disclosure relates generally to optical networks and, more particularly, to a system and method for communicating wireless data utilizing a passive optical network.

BACKGROUND

High speed wireless services, such as WiMAX, are becoming more widespread and may be necessary for a mobile subscriber to utilize some communication sessions, such as streaming video. A wireless network cell providing high speed wireless service is typically not a very large size because a wireless network cell's coverage range decreases as the wireless service data throughput increases. As a mobile subscriber moves from cell to cell while traveling, handovers must be executed between the base stations associated with the cells, such handovers may cause an interruption in service. As a result of the small cell size of high speed wireless service, a subscriber may be required to execute more frequent handovers than when a lower speed service is implemented, thus making interruptions in service more likely. Thus, the ability to provide a system and a method for providing a good mechanism for handovers between high speed wireless service cells in a mobile network environment presents a significant challenge to system designers and network operators.

SUMMARY

In one embodiment, a method for providing wireless communications utilizing a passive optical network is disclosed. The method includes receiving, at an optical line terminal (OLT) communicatively coupled to a base station of a wireless communication network and a remote node, downstream packets from the base station destined for a mobile station, and transmitting the downstream packets to the remote node as one or more optical signals, the OLT associated with a passive optical network (PON). The method also includes receiving, at the remote node communicatively coupled to the OLT and a plurality of optical network terminals (ONTs), the downstream packets from the OLT and transmitting a copy of the downstream packets to each of the plurality of ONTs. The method also includes receiving, at a first ONT communicatively coupled to the remote node and a first wireless transceiver, the downstream packets from the remote node and transmitting the downstream packets to the first wireless transceiver. The method also includes receiving, at a second ONT communicatively coupled to the remote node and a second wireless transceiver, the downstream packets from the remote node and transmitting the downstream packets to the second wireless transceiver. The method also includes receiving, at the first wireless transceiver communicatively coupled to the first ONT, the downstream packets from the first ONT and transmitting a first wireless signal comprising the downstream packets to a first cell. The method also includes receiving, at the second wireless transceiver communicatively coupled to the second ONT, the downstream packets from the second ONT and transmitting a second wireless signal comprising the downstream packets to a second cell.

A more particular embodiment may include the mobile station continuing to receive the downstream packets without executing a handover when the mobile station enters the second cell from the first cell. Another embodiment may include receiving, at a receiver communicatively coupled to the OLT, a non-optical signal comprising the downstream packets, converting the non-optical signal comprising the downstream packets to an optical signal comprising the downstream packets, and transmitting the optical signal comprising the downstream packets to the remote node via an optical fiber.

A more particular embodiment may include receiving, at a receiver communicatively coupled to the first ONT, the optical signal comprising the downstream packets from an optical fiber coupled to the remote node and converting the optical signal comprising the downstream packets to an electrical signal comprising the downstream packets for communication to the wireless transceiver for communication to the first cell. Another embodiment may include the first wireless transceiver and the second wireless transceiver utilizing Worldwide Interoperability for Microwave Access (WiMAX) technology to transmit high speed wireless signals comprising the downstream packets to the first cell and to the second cell.

Technical advantages of one or more embodiments of the present disclosure may include providing reliable high speed wireless service along a vehicular pathway. Another advantage includes eliminating the requirement of handovers between adjacent cells associated with the same passive optical network. By eliminating the requirement of handovers, communication system decreases latency, packet loss, interruptions, and abnormal terminations of high speed wireless communication sessions.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of particular embodiments of the disclosure and their features and advantages, reference is now made to the following description, taken in conjunction with the accompanying drawings, in which.

DETAILED DESCRIPTION

Figure 1:
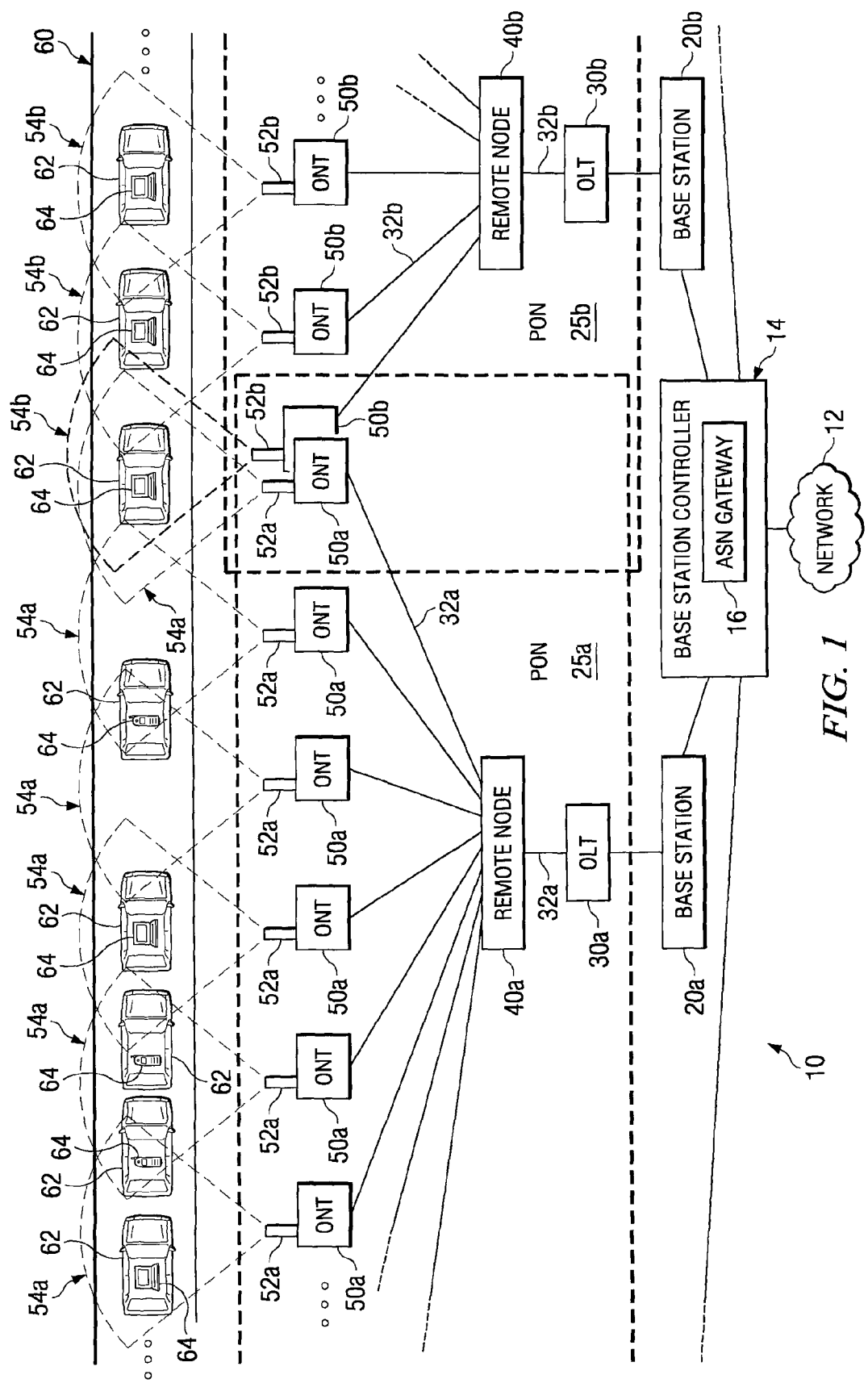
FIG. 1 is a diagram illustrating an example communication network for communicating high speed wireless data utilizing a passive optical network.

FIG. 1 is a diagram illustrating an example communication network for communicating high speed wireless data utilizing a passive optical network (PON). As illustrated, communication system 10 includes a network 12, a base station controller 14, access service network (ASN) gateway 16, one or more base stations 20, one or more PONs 25, one or more high speed wireless cells 54, a vehicular pathway 60, one or more vehicles 62, and one or more mobile stations 64. PON 25 may be communicatively coupled to base station 20. PON 25 may include an optical line terminal (OLT) 30, optical fiber 32, a remote node 40, and one or more optical network terminals (ONTs) 50. ONT 50 may include a wireless transceiver 52. In FIG. 1, all elements identified with an 'a' are associated with communications to or from base station 20a and all elements identified with a 'b' are associated with communications to or from base station 20b. Other embodiments may utilize additional base stations and PONs to provide high speed wireless service along vehicular pathway.

In accordance with the teachings of the present disclosure, the PON architecture allows a high speed downstream packet originating from base station 20 to be broadcast to multiple wireless cells 54 along vehicular pathway 60. It should be noted that a "downstream" packet refers to a packet traveling in the direction from OLT 30 to mobile station 64. Typically, a base station may only have a limited high speed wireless circular cell range spanning one or two kilometers. However, base station 20 utilizing PON 25 may have a high speed wireless cell range of up to forty kilometers along vehicular pathway 60. For example, each base station 20 may have an associated OLT 30 which has associated ONTs 50 positioned along vehicular pathway 60 to transmit overlapping cells 54 along vehicular pathway 60. Each ONT 50 may be positioned up to twenty kilometers from OLT 30. For example, a first ONT 50 of PON 25 may be positioned twenty kilometers in one direction from OLT 30 and a last ONT 50 of PON 25 may be positioned twenty kilometers in the opposite direction from OLT 30, such that the distance between the first ONT 50 and the last ONT 50 may be up to forty kilometers. Each PON 25 may utilize up to thirty-two ONTs 50, such that a forty mile portion of vehicular pathway 60 may have an ONT 50 positioned every 1.25 kilometers. Communication system 10 may utilize a plurality of PONs 25, such that an ONT 50 associated with one PON 25 may be positioned adjacent to an ONT 50 associated with another PON 25 along vehicular pathway 60 to allow a handover between the base station 20 associated with each PON 25. Multiple PONs 25 may be utilized to position ONTs 50 along long expanses of a vehicular pathway.

Each ONT 50 may utilize a wireless transceiver 52 to provide high speed wireless service to a cell 54. The system operator may configure the ONT positioning and cell size to achieve overlap among adjacent cells 54 along vehicular pathway 60. For example, cell size 54 may extend for 1.25 kilometers with a 120 degree coverage range. In this example, each "cell" is really a "sector" of a traditional base station cell. In particular embodiments, each cell 54 associated with a PON 25 may be treated as sectors of the same base station, such that a handover is not required when mobile station 64 moves from one cell 54 to another cell 54. Handovers are performed between cells 54 of adjacent PONs 25/base stations 20. Mobile stations 64 may travel in a vehicle 62 at a very high speed along vehicular pathway 60, such that handovers may be more likely to fail. If a handover fails, the communication session may be temporarily disrupted or the communication session may be terminated abnormally. By eliminating the requirement of handovers between adjacent cells 54 associated with the same PON 25, communication system 10 reduces the number of required handovers and thus decreases latency, packet loss, interruptions, and abnormal terminations of high speed wireless communication sessions. This may be an important feature for communication sessions occurring in a high speed environment, such as vehicular pathway 60, because a handover between cells may not be executed timely before mobile station 64 has entered another new cell 54.

According to the illustrated embodiment, communication system 10 provides services such as communication sessions to endpoints such as a mobile station 64. A communication session refers to an active communication between endpoints. Information may be communicated during a communication session. Information may include voice, data, text, audio, video, multimedia, control, signaling, and/or other information. Information may be communicated in packets or frames, each comprising a bundle of data organized in a specific way for transmission. Communication session may travel over a wireless network and a PON 25 during a single session. Communication system 10 allows mobile station 64 to connect to network 12 with session continuity with little or no latency even though mobile station 64 may be moving at a very high speed between cells 54.

In one particular embodiment, portions of communication system 10, such as base station controllers 14, base stations 20, and wireless transceivers 52, may generally be configured or arranged to utilize a wireless network, such as Worldwide Interoperability for Microwave Access (WiMAX) technology based on the IEEE 802.16-2004 standard. In a more particular embodiment, communication system 10 may utilize mobile WiMAX technology based on the 802.16e-2005 amendment to the IEEE 802.16-2004 standard. It should be noted, that the IEEE 802.16 family of standards, including the 802.16e-2005 amendment will be referred to in this disclosure as the WiMAX standards. The WiMAX standards are provided for example purposes only and communication system 10 may alternatively utilize any communication technology capable of providing mobile or fixed wireless broadband services. Communication system 10 may also utilize any other suitable wireless communication technologies, such as code division multiple access (CDMA), CDMA2000, GSM, general packet radio service (GPRS), EDGE, universal mobile telecommunications system (UMTS), evolution-data optimized (EV-DO), IEEE 802.11 (Wi-Fi), or any combination of the preceding.

Communication system 10 may utilize any suitable communication protocol and/or technology to provide communication sessions. Examples of communication protocols and technologies include those set by the Institute of Electrical and Electronics Engineers, Inc. (IEEE) standards, the International Telecommunications Union (ITU-T) standards, the European Telecommunications Standards Institute (ETSI) standards, the Internet Engineering Task Force (IETF) standards (for example, IP such as mobile IP), or other standards. In this manner, communication system 10 may support any form and/or combination of point-to-point, multicast, unicast, or other techniques for exchanging media packets. Since IP networks share a common method of transmitting data, telecommunication signals may be transmitted between devices located on different, but interconnected, IP networks via network 12. In addition to being coupled to other IP networks, components of communication system 10 may also be coupled to non-IP telecommunication networks, for example through the use of any suitable interface and/or gateway.

Network 12 may represent communication equipment, including hardware and any appropriate controlling logic, for interconnecting elements coupled to network 12. In particular, network 12 may enable the communication of audio and/or video telecommunication signals, data, and/or messages, including signals, data, or messages transmitted through text chat, instant messaging, and e-mail. Network 12 may comprise all, or a portion of, a radio access network (RAN), a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate certain communication capabilities, network 12 may include any combination of gateways, routers, hubs, switches, access points, and any other hardware, software, or any combination of the preceding that may implement any suitable protocol or communication. While the illustrated embodiment indicates that communication system 10 includes a single network 12, communication system 10 may include any number or arrangement of networks 12.

Base station controller 14 may operate to control one or more base stations 20. Base station controller 14 may control handovers of mobile station 64 moving from one cell 54*a* associated with one base station 20*a* to another cell 54*b* associated with another base station 20*b*. This type of handover may be called a hard handover. A handover may also be referred to as a handoff. A hard handover may allow mobile station 64 to stay on same channel, but a connection to a first cell 54*a* may be broken before a connection to a second cell 54*b* may occur. Thus, a hard handover may cause an interruption and/or increase latency of a communication session associated with a particular mobile station 64 when the connection to the first cell 54*a* and the particular mobile station 64 is broken before a connection to the second cell 54*b* and the particular mobile station 64 is established. If mobile station 64 is traveling at a high speed between cells 54, then mobile station 64 may not be in one cell 54 long enough to complete a proper handover. If a handover fails, the communication session may be temporarily disrupted or the communication session may be terminated abnormally. In one embodiment, base station controller 14 may be required to confirm there is enough capacity in the newly entered cell 54. After confirmation, base station controller 14 may attempt to begin new connection with mobile station 64 with the newly entered cell 54. A handover may be requested by mobile station 64, any base station 20 with an associated cell 54 providing service to mobile station 64, or any base station 20 adjacent to a neighboring base station 20 with an associated cell 54 providing service to mobile station 64. To provide the recited functionality, base station controller 14 may include any suitable number and combination of processors, memories, and other hardware. Base station controller 14 may also include software and encoded logic for execution by one or more processors.

Communication system 10 may include any suitable components to accomplish tasks identified throughout this disclosure that are well known to those skilled in the art. In one embodiment, communication system 10 may utilize WiMAX technology and WiMAX technology may require an access service network (ASN) gateway 16 to accomplish the tasks discussed in this disclosure. In one embodiment, base station controller 14 may include ASN gateway 16. ASN gateway 16 may perform multiple operations, such as the authorization, authentication, and accounting (AAA), context management, profile management, service flow authorization, paging, radio resource management, aggregation of control plane functions, routing and aggregation of bearer control plane functions, and handover. ASN gateway 16 operations for the data plane may include mapping radio bearer to the IP network, packet inspection, tunneling, admission control, policing, quality of service (QoS), and data forwarding. ASN gateway 16 may identify mobile station 64 and its subscribed credentials such as allowed QoS rate, number of flows, type of flows, etcetera.

ASN gateway 16 may also assist in mobility and forwarding packets. During a handover, ASN gateway 16 may be responsible to provide context to base stations 20 and ASN gateway 16 may change the path of the packets destined to mobile station 64 to the appropriate base station 20. ASN gateway 16 may store the location information of mobile stations 64 as well. ASN gateway 16 may utilize a paging service to track mobile stations 64 that are operating in the idle mode. During active operation, the location information for each mobile station 64 in communication system 10 is updated as mobile station 64 moves between base stations 20. For example, ASN gateway 16 may update the location of mobile station 64 when mobile station 64 moves from cell 54*a* associated with base station 20*a* to a new cell 54*b* associated with base station 20*b*. In order to further minimize the latency and packet loss, ASN gateway 16 may implement data integrity either by performing bi/multi-casting and/or buffering.

Base stations 20 represent equipment that supports wireless communications to cells 54 providing wireless service to mobile stations 64 in communication system 10. Base stations 20 may generally include any number and configuration of devices and components operable to transmit and receive wireless radio signals. Such devices and components may include radio towers, wireless transceivers, transmitters, receivers, antennas, signal processors, signal amplifiers and other suitable equipment for signal management. Base stations 20 may also include encryption and decryption elements for processing communications between components of communication system 10. Base station 20 may also be operable to discard duplicate upstream packets. It should be noted that an "upstream" packet refers to a communication session traveling in the direction from mobile station 64 to OLT 30. Duplicate upstream packets may occur in a multitude of ways. For example, multiple ONTs 50 and/or wireless transceivers 52 may each receive the same packet transmitted by mobile station 64. Base station 20 may examine all upstream packets to determine if it has received duplicate copies of a packet. If base station 20 determines it has received one or more duplicate packets, then base station 20 may keep one and discard the remaining duplicate packets. Base station 20 may determine if the packet is a duplicate by examining the wireless header and/or payload. Additionally, mobile station 64 may utilize space diversity by intentionally creating two different identical signals and combining the two signals into one signal to increase signal strength of transmission. If both signals reach base station 20, then base station 20 may determine which signal is stronger and discard the weaker duplicate signal. Other scenarios for duplicate signals may include a delay of signal from mobile station 64 or a reflection wave from a signal.

In operation, each base station 20 may handle or otherwise manage communication sessions within a cell area or cell range 54 associated with base station 20. For existing networks, a base station may handle communication sessions within a circular cell, such that the circular coverage range may include three 120 degree sectors. For existing networks, each sector may only handle communication sessions for the mobile stations within that particular sector. Typically, if a mobile station moves from one sector to another sector within the same circular coverage range associated with the same base station, then a soft handover may occur. A soft handover may refer to a handover in which the mobile station maintains connection with current sector and concurrently establishes connections with additional sectors. A soft handover may occur based on the sector that has the highest signal strength with the mobile station. A soft handover may cause an interruption and/or increase latency of the communication session.

In communication system 10, each cell 54 associated with a particular base station 20 may be treated as the same sector of a traditional particular base station, such that handovers are not required when mobile station 64 moves between cells 54 associated with a particular base station 20. As a result of treating each cell 54 as the same sector of a traditional base station, base station 20 may service multiple cells 54 stringed together that form a linear cell range along vehicular pathway 60 rather than a typical circular cell range. In one embodiment of communication system 10, base station 20 may provide wireless service to thirty-two associated cells 54 by utilizing PON 25. Base station 20 may utilize any suitable protocol or communication technique to transmit and receive packets associated with base station controller 14 and OLT 30.

In one particular embodiment, communication system 10 may generally be configured or arranged to utilize a PON 25, such as an asynchronous transfer mode PON (APON), a broadband PON (BPON), a gigabit PON (GPON), a gigabit Ethernet PON (GEPON), a wavelength division multiplexing PON (WDMPON), or any other suitable PON. PONs 25 provide greater bandwidth than typical communication networks. For example, networks such as digital subscriber line (DSL) networks that transmit traffic over copper telephone wires typically transmit at a rate between approximately 144 kilobits per second (KB/s) and 1.5 megabits per second (MB/s). Conversely, a broadband PON (BPON) may provide hundreds of megabits per second capacity shared by thirty-two users. Gigabit PON (GPON), which typically operate at speeds of up to 2.5 gigabits per second (Gbps) by using more powerful transmitters, provide even greater bandwidth. The bandwidth of PON 25 will depend on the type of PON 25 implemented in communication system 10.

OLT 30 may represent any suitable combination of hardware, software, and logic that facilitates a communication session between mobile station 64 and base station 20. OLT 30 may be communicatively coupled to base station 20 and RN 40 to facilitate downstream and upstream packets associated with mobile station 64 and base station 20. OLT 30 may include one communication interface to communicate with RN 40 and another interface to communicate with base station 14. OLT 30 may receive a downstream packet from base station 14 and broadcast the downstream packet to ONTs. OLT 30 may include a processor to convert an electrical or wireless signal from base station 20 to an optical wavelength to be transported via optical fiber 32. OLT 30 may include an optical transmitter operable to transmit downstream packets in a downstream wavelength, such as $\lambda_d$, for broadcast to all ONTs 50. In a typical PON, OLT may append an Ethernet header to a downstream packet to identify the MAC address of a particular ONT to receive the packet destined to a mobile station. In one embodiment, OLT 25 may broadcast downstream packets to all ONTs 50, such that an Ethernet header identifying a MAC address of a particular ONT 50 is not required. Communication system 10 broadcasts downstream packets so that identical packets are transmitted to each cell 54.

OLT 30 may also include an optical receiver operable to receive traffic from all ONTs 50 via remote node 40 in a time-shared upstream optical wavelength, $\lambda_u$. In typical PONs 25, downstream traffic in $\lambda_d$ and $\lambda_v$ is transmitted at a greater bit rate than is traffic in $\lambda_u$, as PONs 25 typically provide lower upstream bandwidth than downstream bandwidth. In one embodiment, OLT 30 may convert a received upstream wavelength to a high speed wireless signal to be transmitted to base station 20.

Optical fiber 32 may include any suitable fiber to carry upstream and downstream traffic. In certain PONs 25, optical fiber 32 may comprise, for example, bidirectional optical fiber. In other PONs 25, optical fiber 32 may comprise two distinct fibers. The distance of optical fiber 32 between an ONT 30 and remote node 40 may be used to control the delay difference of communication sessions between cells 54 located at different distances from remote node 40.

RN 40 may represent any suitable combination of hardware, software, and logic that facilitates a communication session between mobile station 64 and base station 20. RN 40 (which may also generally be referred to as a distribution node) comprises any suitable power splitter, such as an optical coupler, and connects OLT 30 to ONTs 50 via optical fiber 32. RN 40 may be located in any suitable location and is operable to split a downstream signal such that each ONT 50 receives a copy of the downstream signal. In addition to splitting downstream signals, RN 40 is also operable to combine into one signal upstream, time-shared signals transmitted by ONTs 50. RN 40 is operable to forward the upstream signal to OLT 30.

ONT 50 may represent any suitable combination of hardware, software, and logic that facilitates a communication session between mobile station and base station. ONT 50 may include any suitable optical network unit communicatively coupled to wireless transceiver 52 to provide high speed wireless service to cell 54. For downstream packets, ONT 50 may convert optical wavelengths received from RN 40 to an electrical signal and transmit electrical signal to wireless transceiver 52. Wireless transceiver 52 may convert electrical signal to a wireless signal, such as WiMAX. For upstream packets, ONT 50 may receive wireless signals received from wireless transceiver 52 and convert wireless signal to an electrical signal. ONT 50 may convert the electrical signal to optical wavelengths that may be transmitted to RN 40 according to an appropriate time-sharing protocol (such that the traffic transmitted by one ONT in $\lambda_u$ does not collide with the traffic of other ONTs 50 in $\lambda_u$. Typically, PONs 25 have thirty-two ONTs 50 per OLT 30, and thus, many example PONs 25 may be described as including this number of ONTs 50. However, any suitable number of ONTs 50 per OLT 30 may be provided. In one embodiment, ONTs 50 may include an optical receiver to receive downstream optical wavelength traffic in $\lambda_d$ and on optical transmitter to transmit upstream optical wavelength traffic in $\lambda_u$. The transmission rate of the ONT 50 optical transmitter may be less than the transmission rate of the OLT 30 optical transmitter (due to less demand for upstream capacity than for downstream capacity).

Wireless transceiver 52 may represent any suitable device and/or component to transmit and receive high speed wireless signals. In one embodiment, wireless transceiver 52 may include a wireless transmitter, a wireless receiver, and an antenna. Wireless transceiver 52 may be integrated with ONT 50 or it may be separate from ONT 50. In one embodiment, wireless transceiver 52 may provide high speed wireless service in a 120 degree arc to cell 54 covering vehicular pathway 60.

Cell 54 may represent a range providing high speed wireless service to mobile stations 64. In one embodiment, each cell 54 associated with PON 25 or base station 20 may transmit the same packets. As a result, a handover is not required when mobile station 64 moves from one cell 54 to another cell 54. By eliminating the requirement of handovers between adjacent cells 54 associated with the same PON 25, communication system 10 decreases latency, packet loss, interruptions, and abnormal terminations of high speed wireless communication sessions. Cell 25 size may be dependent on the throughput of the data transmitted. For example, WiMAX may be able to transmit data with a throughput of up to 130

Mbps, but this throughput may only be achievable if the cell size is very small. WiMAX may be able to transmit data across a cell size of 150 kilometers, but this results in a very small throughput. The size of cell 54 providing WiMAX technology may increase as throughput is lowered and decrease as throughput is raised. Operator of communication system 10 may configure the throughput and/or cell size. In one embodiment utilizing thirty-two ONTs 50 in a PON 25, cells 54 of a PON 25 may be able to provide high speed wireless service across forty kilometers because a first ONT 50 may be located twenty kilometers from OLT 30 in one direction and a thirty-second ONT 50 may be located twenty kilometers from OLT 30 in the opposite direction. Therefore, in one embodiment, each ONT 50 may be located 1.25 kilometers apart from one another so that thirty two ONTs 50 can provide high speed wireless service across a forty kilometer range along vehicular pathway 60. As a result, in this embodiment, cell size should be configured to cover at least 1.25 kilometers. Operator may wish to increase cell size to achieve a suitable overlap between adjacent cells, such that every portion of vehicular pathway 60 is covered by at least one cell 54. As a result, mobile station 64 will continually be able to receive a communication session seamlessly because mobile station 64 will always be covered by a cell 54.

In one embodiment, operator of communication system 10 may configure one PON 25a to overlap with an adjacent PON 25b, such that cell 54a associated with one base station 20a may overlap cell 54b associated with another base station 54b. The overlapped cells 54a, 54b may facilitate successful execution of a hard handover by allowing more time for the execution of the hard handover to complete when mobile station 64 moves from one cell 54a associated with one base station 20a to another cell 54b associated with another base station 20b. In the illustration of FIG. 1, only one ONT 50b and its associated wireless transceiver 52b are shown to overlap with another PON 25a, but the operator of communication system 10 may position multiple ONTs 50b associated with one PON 25b to overlap with another PON 25a. Communication system 10 may overlap one PON 25b with another PON 25a to facilitate successful execution of a hard handover and provide wireless service to a long expanse of wireless service associated with a particular PON that may not require the execution of a handoff.

Vehicular pathway 60 may be any component providing a pathway for a vehicle to travel. For example, vehicular pathway 60 may be a paved road or train tracks. Vehicular pathway 60 may be positioned in any shape or size. For example, a vehicular pathway may be straight or it may be an 'S' shape. Vehicle 62 may be any device or component that is operable to travel along vehicular pathway 60. For example, vehicle 62 may be a motorcycle, car, truck, subway, or train.

Mobile station 64 may represent any suitable combination of hardware, software, and/or encoded logic to provide wireless communication services to a user. For example, mobile stations 64 may include telephones, cell phones, laptops, desktops, end user devices, video monitors, cameras, personal digital assistants (PDAs), or any other wireless communication hardware, software, and/or encoded logic that supports the communication of voice, video, text or other suitable forms of data. As noted above, mobile station 64 may communicate with ONT 50 and/or wireless transceiver 52 using any suitable telecommunication standard or protocol.

In an example operation of communicating a downstream packet in one embodiment of communication system 10, OLT 30 of a typical PON 25 may receive from base station 20 a downstream high speed wireless signal comprising a packet destined for a particular mobile station 64 along vehicular pathway 60, convert the high speed wireless signal to an optical wavelength, and transmit the optical wavelength comprising the packet to one or more of ONTs 50 in $\lambda_d$ via remote node (RN) 40 on optical fibers 32. RN 40 splits the downstream traffic into a suitable number of copies and forwards each copy to a corresponding ONT 50. Each ONT 50 receives a copy of the downstream traffic in $\lambda_d$, converts the downstream wavelengths to a high speed wireless signal, and transmits the high speed wireless signal in its associated cell 54 covering a portion of vehicular pathway 60. As a result, mobile station 64 traveling at a high rate of speed in vehicle 62 along vehicular pathway 60 may seamlessly continue to receive a downstream communication session without requiring a handoff when moving between cells 54 of the same PON 25.

In an example operation of communicating an upstream packet in one embodiment of communication system 10, each ONT 50 may receive from an mobile station 64 an upstream wireless signal comprising a packet destined for an element connected to network, convert the wireless signal to an optical wavelength, and transmit the upstream optical wavelength comprising the packet in $\lambda_u$ along fiber 32 according to a suitable time-sharing protocol (such that upstream traffic does not collide). RN 40 receives the upstream traffic from each ONT 50 and combines the traffic from each ONT 50 into one optical wavelength. RN 40 forwards the signal over optical fiber 32 to OLT 30. OLT 30 receives the upstream optical wavelength, converts the optical wavelength to an electrical signal, and transmits the electrical signal to base station 20. As a result, mobile station 64 traveling at a high rate of speed in vehicle 62 along vehicular pathway 60 may seamlessly continue to transmit a wireless upstream communication session without requiring a handover when moving between cells 54 of the same PON 25.

Figure 2:
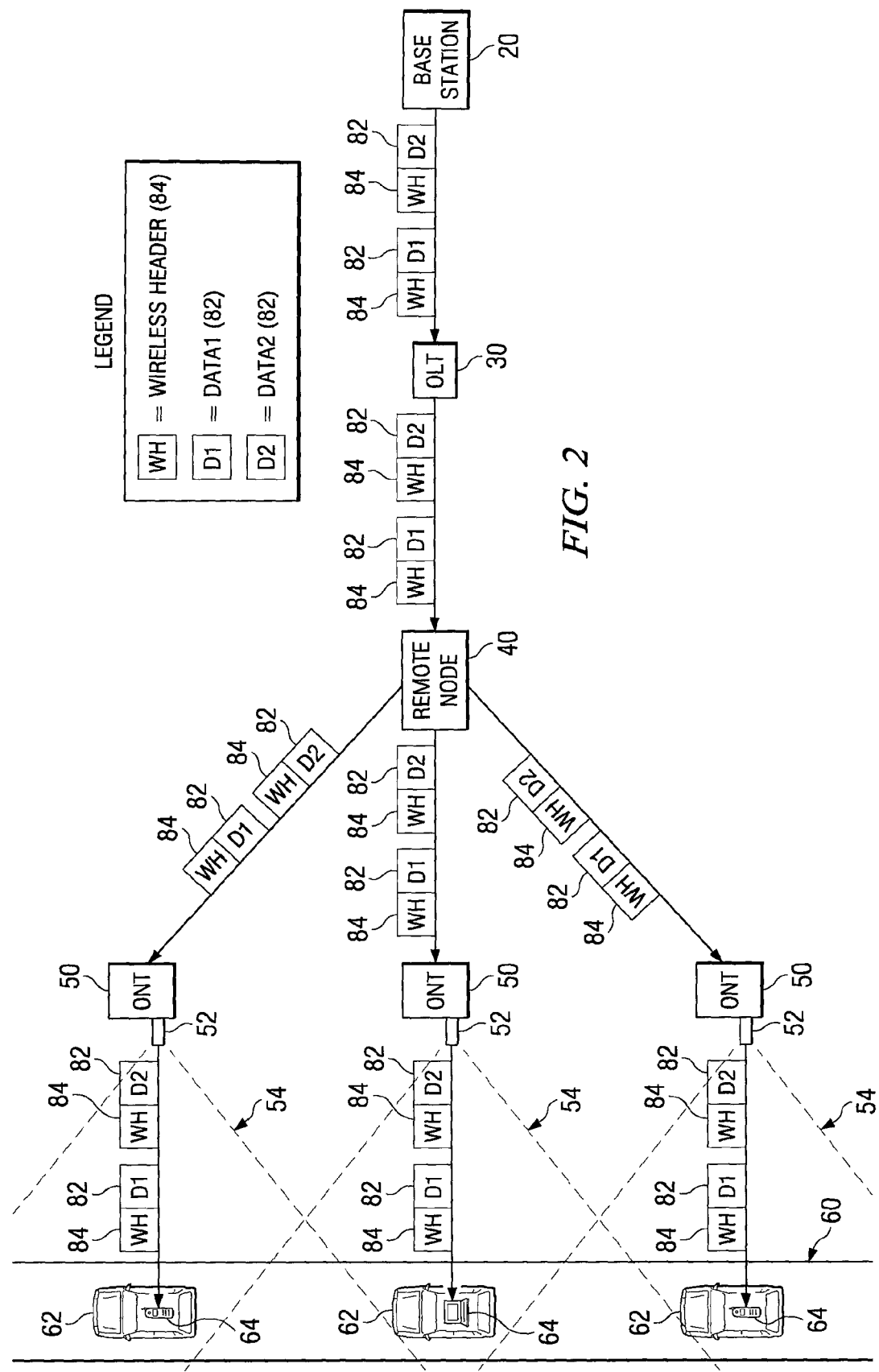
FIG. 2 is a diagram illustrating the communication network of downstream high speed wireless data in the network of FIG. 1.

FIG. 2 is a diagram illustrating the communication network of downstream high speed wireless data in the network of FIG. 1. OLT 30 of a typical PON 25 may receive from base station 20 a first downstream high speed wireless signal comprising a packet destined for a first mobile station 64 along vehicular pathway 60. OLT 30 of a typical PON 25 may also receive from base station 20 a second downstream high speed wireless signal comprising a packet destined for a second mobile station 64 along vehicular pathway 60. Packet may comprise a payload 82 and a wireless header 84. Payload 82 may be data or any other suitable information. Wireless header 84 may be an object that identifies characteristics of the packet. Wireless header 84 may identify the mobile station 64 to receive the packet and the mobile station or other source that sent the packet.

In a typical PON, OLT may append an Ethernet header to a downstream packet to identify the MAC address of a particular ONT to receive the packet destined to a mobile station. In one embodiment, OLT 25 may broadcast the downstream packet to all ONTs 50, such that an Ethernet header identifying a MAC address of a particular ONT 50 is not required. OLT 30 broadcasts downstream traffic to each ONT so that identical traffic is transmitted to each cell 54 associated with OLT 30. OLT 30 may convert an electrical or wireless signal from base station 20 to optical signals communicated on one or more wavelengths, such as $\lambda_d$. OLT 30 may transmit the optical signals comprising the packet to one or more ONTs 50 in $\lambda_d$ via remote node 40.

RN 40 splits the downstream optical signals into a suitable number of copies and forwards each copy to a corresponding ONT 50. Each ONT 50 receives a copy of the optical signals (which include the first and second downstream packet) in $\lambda_d$. Each ONT 50 and its associated wireless transceiver 52 may convert the received optical signal to a first high speed wireless signal and a second high speed wireless signal. Each ONT 50 may transmit the first and second high speed wireless signals to a corresponding cell 54, such that cells 54 cover vehicular pathway 60. All cells 54 associated with a corresponding base station 20 may transmit high speed wireless signals comprising identical packets so that a mobile station 64 may receive the signal in any of the cells 54.

A first mobile station 64 may travel in a first vehicle 62 and a second mobile station 64 may travel in a second vehicle 62. Each mobile station 64 may travel at a high rate of speed along vehicular pathway 60. The first and second mobile stations 64 may be in the same cell or different cells and achieve the same result. First mobile station 64 may receive the high speed wireless packet comprising the wireless header 84 identifying the first mobile station 64 as the destination of the packet. Second mobile station 64 will receive the high speed wireless packet comprising the wireless header 84 identifying the second mobile station 64 as the destination of the packet. The first and second mobile station 64 may each seamlessly continue to receive their respective high speed wireless downstream packets associated with a communication session without requiring a handoff when either mobile station enters one cell 54 from another cell 54 associated with same base station 20.

Figure 3:
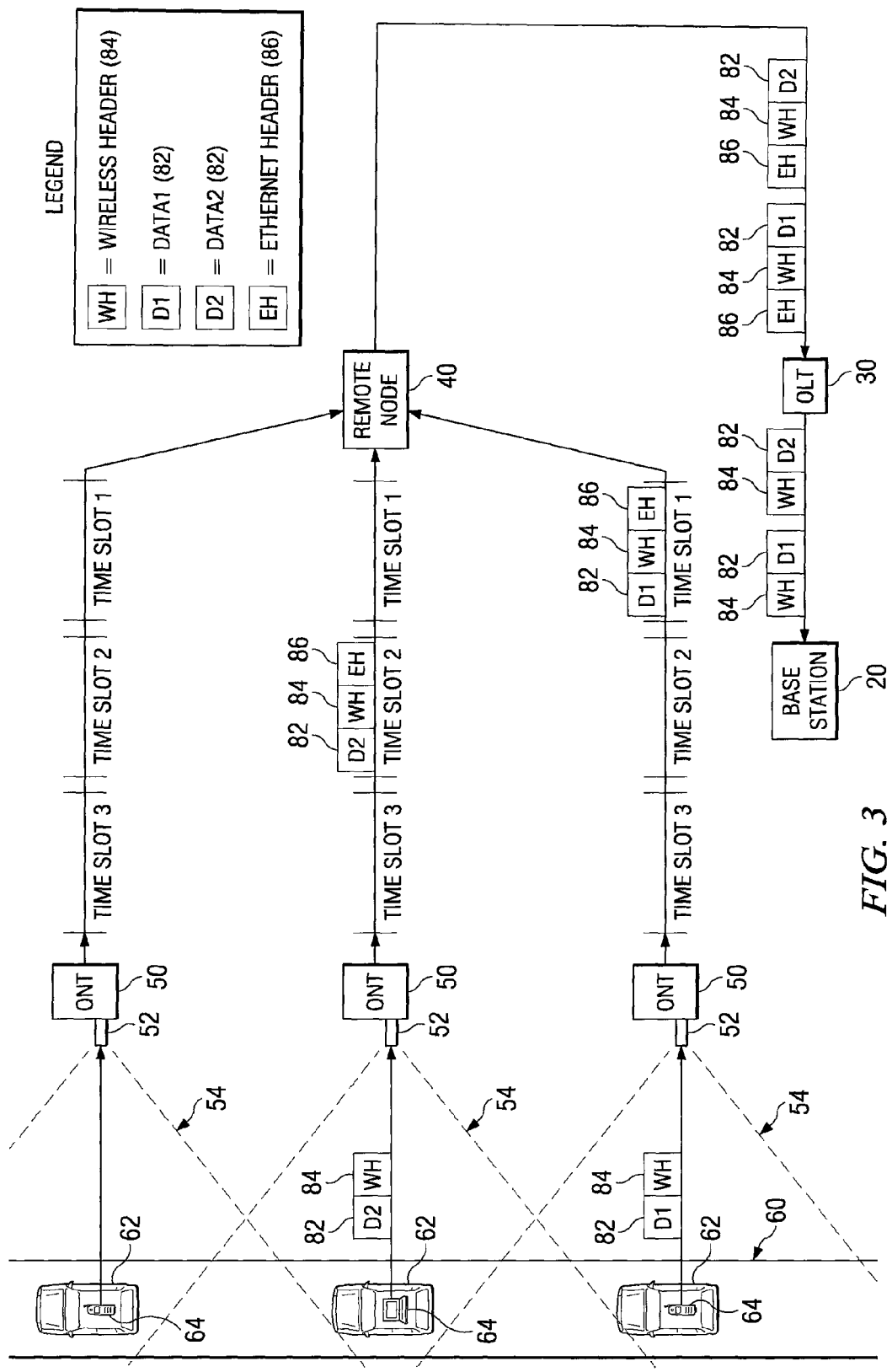
FIG. 3 is a diagram illustrating the communication network of upstream wireless data in the network of FIG. 1.

FIG. 3 is a diagram illustrating the communication network of upstream wireless data in the network of FIG. 1. A first mobile station 64 may travel in a first vehicle 62 and a second mobile station 64 may travel in a second vehicle 62. Each mobile station 64 may travel at a high rate of speed along vehicular pathway 60. The first and second mobile stations 64 may be in the same cell or different cells 54 and achieve the same result. First mobile station 64 may transmit a first upstream wireless signal comprising a first packet. Second mobile station 64 may transmit a second upstream wireless communication signal comprising a second packet. Packet may comprise a payload 82 and a wireless header 84. Payload 82 may be data or any other suitable information. Wireless header 84 may be an object that identifies characteristics of the packet. Wireless header 84 may identify the mobile station 64 that transmitted the packet and the mobile station destined to receive the packet. The destination mobile station or other device may be located remotely outside of communication system 10 and contacted via network 12. The first and second mobile station 64 may each seamlessly continue to transmit their respective wireless upstream packets associated with a communication session without executing a handoff when either mobile station enters one cell 54 from another cell 54 associated with the same base station 20.

Each ONT 50 and its associated wireless transceiver 52 may receive from a mobile station 64 an upstream wireless signal comprising a packet destined for a mobile station 64 or other destination. For example, a first ONT 50 and its associated wireless transceiver 52 may receive a first upstream wireless signal from a first mobile station 64 located in a first cell 54. A second ONT 50 and its associated wireless transceiver 52 may receive a second upstream wireless signal from a second mobile station 64 located in a second cell 54.

Each ONT 50 and/or its associated wireless transceiver 52 may convert each wireless signal to an optical signal. In one embodiment, ONT 50 may append an Ethernet header 86 to each packet. Ethernet header 86 may identify the ONT 50 that transmitted the upstream packet. OLT 30 may use the Ethernet header identifying each ONT 50 to manage assigning a time slot to transmit each upstream optical signal according to a suitable time-sharing protocol, such that upstream traffic does not collide. For example, at time slot one, first ONT 50 may transmit first upstream optical signal in $\lambda_u$ comprising the first packet along fiber 32. At time slot two, second ONT 50 may transmit second upstream optical signal in $\lambda_u$ comprising the second packet along optical fiber 32.

RN 40 receives the upstream traffic from each ONT 50 and combines the traffic from each ONT 50. RN 40 forwards the signal over optical fiber 32 to OLT 30. OLT 30 receives the upstream optical signal, converts the optical signal to a wireless or electric signal, and transmits the wireless or electric signal to base station 20. In one embodiment, OLT 30 may remove Ethernet header 86 from packet before transmitting the wireless or electric signal to base station 20.

Base station 20 may receive the first upstream packet and the second upstream packet. Base station 20 may transmit each upstream packet to network via base station controller 14. Base station 20 may also be operable to discard duplicate upstream packets. Duplicate upstream packets may occur in a multitude of ways. For example, multiple ONTs 50 and/or wireless transceivers 52 may each receive the same packet transmitted by mobile station 64. Base station 20 may examine all upstream packets to determine if it has received duplicate copies of packet. If base station 20 determines it has received one or more duplicate packets, then base station 20 may keep one and discard the remaining duplicate packets. Base station 20 may determine if the packet is a duplicate by examining the wireless header 84 and/or payload 82. Additionally, base station 20 may utilize space to combine the two signals into one signal to increase signal strength of transmission. Other scenarios for duplicate signals may include a delay of signal from mobile station 64 or a reflection wave from a signal.

Figure 4:
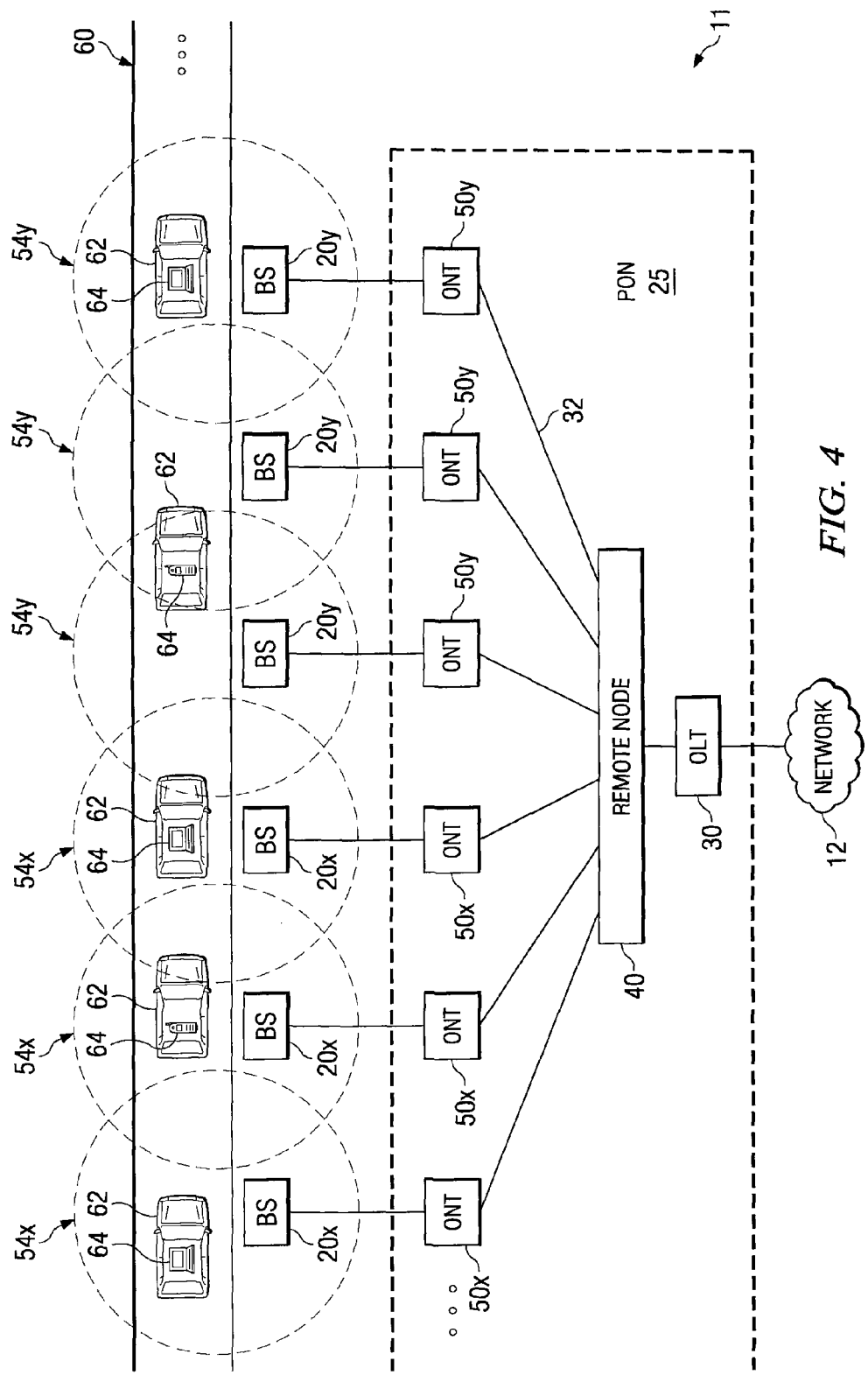
FIG. 4 is a diagram illustrating another example communication network for communicating high speed wireless data utilizing a passive optical network.

FIG. 4 is a diagram illustrating another example communication network for communicating high speed wireless data utilizing a PON 25. As illustrated in FIG. 4, communication system 11 includes a network 12, a base station controller 14, an ASN gateway 16, one or more PONs 25, one or more base stations 20, one or more high speed wireless cells 54, a vehicular pathway 60, one or more vehicles 62, and one or more mobile stations 64. PON 25 may be communicatively coupled to base station controller 14 and base station 20. PON 25 may include an OLT 30, optical fiber 32, a remote node 40, and one or more ONTs 50. In FIG. 4, all elements identified with an 'x' are associated with a communication session to or from multiple base stations 20x and all elements identified with a 'y' are associated with a communication session to or from multiple base stations 20y. Other embodiments may utilize additional base stations 20 and PONs 25 to provide high speed wireless service along entire length of vehicular pathway 60. Communication system 11 as described in FIG. 4 is an alternative embodiment to communication system 10 as described in FIGS. 1-3. In communication system 10, PON 25 is positioned between base station 20 and corresponding cells 54. In alternative embodiment of communication system 11, PON 25 is positioned between base station controller 14 and base stations 20, such that base stations 20 transmit cells 54 along vehicular pathway 60.

In the alternative embodiment of communication system 11, one or more sets of base stations 20 may be configured to receive the same packets from base station controller 14. As a result, the set of similarly configured base stations 20 may transmit high speed wireless signals comprising identical packets to associated cells 54 along vehicular pathway 60. Therefore, the architecture of communication system 11 allows mobile stations 64 to receive identical communication data in each cell 54 associated with a particular set of similarly configured base stations 20, such that a handoff is not required when mobile station 64 enters a new cell 54 as long as the previous cell 54 is associated with same set of similarly configured base stations 20. By not requiring a handoff between these cells, communication system 11 allows mobile station 64 to seamlessly continue communication session without added latency or delay. This may be an important feature for communications occurring in a high speed environment, as discussed above. A hard handover may be required when mobile station 64 moves from one cell 54x associated with one set of similarly configured base stations 20x to another cell 54y associated with another set of similarly configured base stations 20y.

Base station controller 14, ASN gateway 16, and/or each set of base stations 20 must be configured appropriately. For example, each base station 20 in an associated set must be configured with the same identifier. Similarly, base station controller 14 and/or ASN gateway 16 may need to be configured to communicate with a set of base stations 20 with the same identifier. Thus, hard handoffs between base stations 20 configured with the same identifier may not be required.

As noted above, PON 25 may represent an APON, a BPON, a GPON, a GEPON, a PSPON, a WDMPON, or any other suitable PON. In one embodiment of communication system 11, OLT 30 may append an Ethernet header to a downstream packet to identify a MAC address of a particular ONT 50. The set of ONTs 50 communicatively coupled to a set of similarly configured base stations 20 may also be configured so that each ONT 50 in the set has the same MAC address. As a result, each similarly configured ONT 50 and base station 20 may receive the same downstream packet to be transmitted to a corresponding cell 54.

High speed wireless service provided to cells 54 in communication system 11 may achieve higher throughputs than cells in communication system 10 because a base station 20 and its associated transceiver may have more resources to transmit high speed wireless service than an ONT 50 and its associated wireless transceiver 52. The bandwidth provided by similarly configured base stations 60 may decrease as more base stations 20 are configured with the same identifier. As noted above, WiMAX may be able to transmit data with a throughput of up to 130 Mbps, but this throughput may only be achievable if the cell size is very small. WiMAX may be able to transmit data across a cell size of 150 kilometers, but this results in a very small throughput. The throughput of data in cells 54 serviced by similarly configured base stations 20 providing WiMAX technology may increase as the number of base stations 20 that are similarly configured is lowered, and throughput may decrease as the number of base stations 20 that are similarly configured is raised. Operator of communication system 11 may decide the number of base stations 20 to be similarly configured, which may directly effect the amount of throughput that the similarly configured base stations 20 provide to cells 54.

Some of the steps illustrated in FIGS. 2 and 3 may be changed or deleted where appropriate and additional steps may also be added. These changes may be based on specific communication architectures or particular interfacing arrangements and configurations of associated elements and do not depart from the scope or the teachings of the present disclosure. The interactions and operations of the elements disclosed in FIGS. 2 and 3 have provided merely one example for their potential applications. Numerous other applications may be equally beneficial and selected based on particular networking needs.

Although the present disclosure has been described in detail with reference to particular embodiments, communication system 10 may be extended to any scenario in which a wireless network utilizes a PON 25. In addition, some elements may be provided as separate external components to communication system 10 where appropriate. The present disclosure contemplates great flexibility in the arrangement of these elements as well as their internal components. For example, wireless transceiver 52 may be integrated with ONT 50. Moreover, although FIGS. 1-4 illustrate an arrangement of selected elements, numerous other components and algorithms may be used in combination with these elements or substituted for these elements without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A system for providing wireless communications utilizing a passive optical network, comprising:
    a passive optical network (PON) comprising:
        an optical line terminal (OLT) communicatively coupled to a base station of a wireless communication network and a remote node, the OLT configured to receive downstream packets from the base station destined for a mobile station, and the OLT configured to transmit the downstream packets to the remote node in a downstream wavelength;
        the remote node communicatively coupled to the OLT and a plurality of optical network terminals (ONTs), the remote node configured to receive the downstream packets from the OLT and transmit a copy of the downstream packets to each of the plurality of ONTs in the downstream wavelength;
        a first ONT communicatively coupled to the remote node and a first wireless transceiver, the first ONT configured to receive the downstream packets from the remote node and transmit the downstream packets to the first wireless transceiver; and
        a second ONT communicatively coupled to the remote node and a second wireless transceiver, the second ONT configured to receive the downstream packets from the remote node and transmit the downstream packets to the second wireless transceiver;
    the first wireless transceiver communicatively coupled to the first ONT, the first wireless transceiver configured to receive the downstream packets from the first ONT and transmit a first wireless signal comprising the downstream packets to a first cell of the wireless communication network; and
    the second wireless transceiver communicatively coupled to the second ONT, the second wireless transceiver configured to receive the downstream packets from the second ONT and transmit a second wireless signal comprising the downstream packets to a second cell of the wireless communication network.

2. The system of claim 1, wherein the OLT comprises:
    a receiver, the receiver configured to receive a non-optical signal comprising the downstream packets; and
    a transmitter, the transmitter configured to convert the non-optical signal comprising the downstream packets to an optical signal comprising the downstream packets and transmit the optical signal comprising the downstream packets to the remote node via an optical fiber.

3. The system of claim 1, wherein the mobile station is configured to continue to receive the downstream packets without executing a handover when the mobile station enters the second cell from the first cell.

4. The system of claim 1, wherein the first ONT comprises:
a receiver, the receiver configured to receive the optical signal comprising the downstream packets from an optical fiber coupled to the remote node and configured to convert the optical signal comprising the downstream packets to an electrical signal comprising the downstream packets for communication to the wireless transceiver for communication to the first cell.

5. The system of claim 1, wherein the first wireless transceiver and the second wireless transceiver are configured to utilize Worldwide Interoperability for Microwave Access (WiMAX) technology to transmit high speed wireless signals comprising the downstream packets to the first cell and to the second cell.

6. The system of claim 1, wherein the PON is a gigabit PON.

7. The system of claim 1, wherein the first wireless transceiver and the second wireless transceiver are located more than two kilometers from the base station.

8. The system of claim 1, wherein the PON comprises thirty-two ONTs and the first cell covers approximately a 1.25 kilometer range along a vehicular pathway.

9. The system of claim 1, wherein the PON comprises thirty-two ONTs and thirty-two wireless transceivers, the first wireless transceiver is located more than two kilometers from a thirty-second wireless transceiver.

10. A method for providing wireless communications utilizing a passive optical network, comprising:
receiving, at an optical line terminal (OLT) communicatively coupled to a base station of a wireless communication network and a remote node, downstream packets from the base station destined for a mobile station, and transmitting the downstream packets to the remote node in a downstream wavelength, the OLT associated with a passive optical network (PON);
receiving, at the remote node communicatively coupled to the OLT and a plurality of optical network terminals (ONTs), the downstream packets from the OLT and transmitting a copy of the downstream packets to each of the plurality of ONTs in the downstream wavelength;
receiving, at a first ONT communicatively coupled to the remote node and a first wireless transceiver, the downstream packets from the remote node and transmitting the downstream packets to the first wireless transceiver;
receiving, at a second ONT communicatively coupled to the remote node and a second wireless transceiver, the downstream packets from the remote node and transmitting the downstream packets to the second wireless transceiver;
receiving, at the first wireless transceiver communicatively coupled to the first ONT, the downstream packets from the first ONT and transmitting a first wireless signal comprising the downstream packets to a first cell of the wireless communication network; and
receiving, at the second wireless transceiver communicatively coupled to the second ONT, the downstream packets from the second ONT and transmitting a second wireless signal comprising the downstream packets to a second cell of the wireless communication network.

11. The method of claim 10, further comprising:
receiving, at a receiver communicatively coupled to the OLT, a non-optical signal comprising the downstream packets; and
converting the non-optical signal comprising the downstream packets to an optical signal comprising the downstream packets and transmitting the optical signal comprising the downstream packets to the remote node via an optical fiber.

12. The method of claim 10, wherein the mobile station continues to receive the downstream packets without executing a handover when the mobile station enters the second cell from the first cell.

13. The method of claim 10, further comprising:
receiving, at a receiver communicatively coupled to the first ONT, the optical signal comprising the downstream packets from an optical fiber coupled to the remote node and converting the optical signal comprising the downstream packets to an electrical signal comprising the downstream packets for communication to the wireless transceiver for communication to the first cell.

14. The method of claim 10, wherein the first wireless transceiver and the second wireless transceiver utilize Worldwide Interoperability for Microwave Access (WiMAX) technology to transmit high speed wireless signals comprising the downstream packets to the first cell and to the second cell.

15. The method of claim 10, wherein the PON is a gigabit PON.

16. The method of claim 10, wherein the first wireless transceiver and the second wireless transceiver are located more than two kilometers from the base station.

17. The method of claim 10, wherein the PON comprises thirty-two ONTs and the first cell covers approximately a 1.25 kilometer range along a vehicular pathway.

18. The method of claim 10, wherein the PON comprises thirty-two ONTs and thirty-two wireless transceivers, the first wireless transceiver is located more than two kilometers from a thirty-second wireless transceiver.

19. A method for providing wireless communications utilizing a passive optical network, comprising:
receiving, at a first wireless transceiver communicatively coupled to a first optical network terminal (ONT), the upstream packets from a mobile station and transmitting the upstream packets to the first ONT, the first wireless transceiver providing wireless service to a first cell of a wireless communication network;
receiving, at a second wireless transceiver communicatively coupled to a second ONT, the upstream packets from the mobile station and transmitting the upstream packets to the second ONT, the second wireless transceiver providing wireless service to a second cell of a wireless communication network;
receiving, at the first ONT communicatively coupled to a remote node and the first wireless transceiver, the upstream packets from the first wireless transceiver and transmitting the upstream packets to the remote node;
receiving, at the second ONT communicatively coupled to the remote node and the second wireless transceiver, the upstream packets from the second wireless transceiver and transmitting the upstream packets to the remote node;
receiving, at the remote node communicatively coupled to the first and second ONTs, the upstream packets from the first ONT and the second ONT and transmitting the upstream packets from the remote node and
receiving, at an optical line terminal (OLT) communicatively coupled to a base station of a wireless communication network and the remote node, upstream packets from the remote node, and transmitting the upstream packets to the base station of the wireless communication network.

20. The method of claim 19, wherein the first wireless transceiver and the second wireless transceiver are located more than two kilometers from the base station.

21. The method of claim 19, wherein the mobile station continues to transmit the upstream packets without executing a handover when the mobile station enters the second cell from the first cell.

22. The method of claim 19, wherein the mobile station utilizes Worldwide Interoperability for Microwave Access (WiMAX) technology to transmit high speed wireless signals comprising the upstream packets to the first transceiver and to the second transceiver.

23. The method of claim 19, wherein the PON is a gigabit PON.

24. The method of claim 19, wherein the PON comprises thirty-two ONTs and the first cell covers approximately a 1.25 kilometer range along a vehicular pathway.

25. The method of claim 19, wherein the PON comprises thirty-two ONTs and thirty-two wireless transceivers, the first wireless transceiver is located more than two kilometers from a thirty-second wireless transceiver.

* * * * *